UNITED STATES PATENT OFFICE.

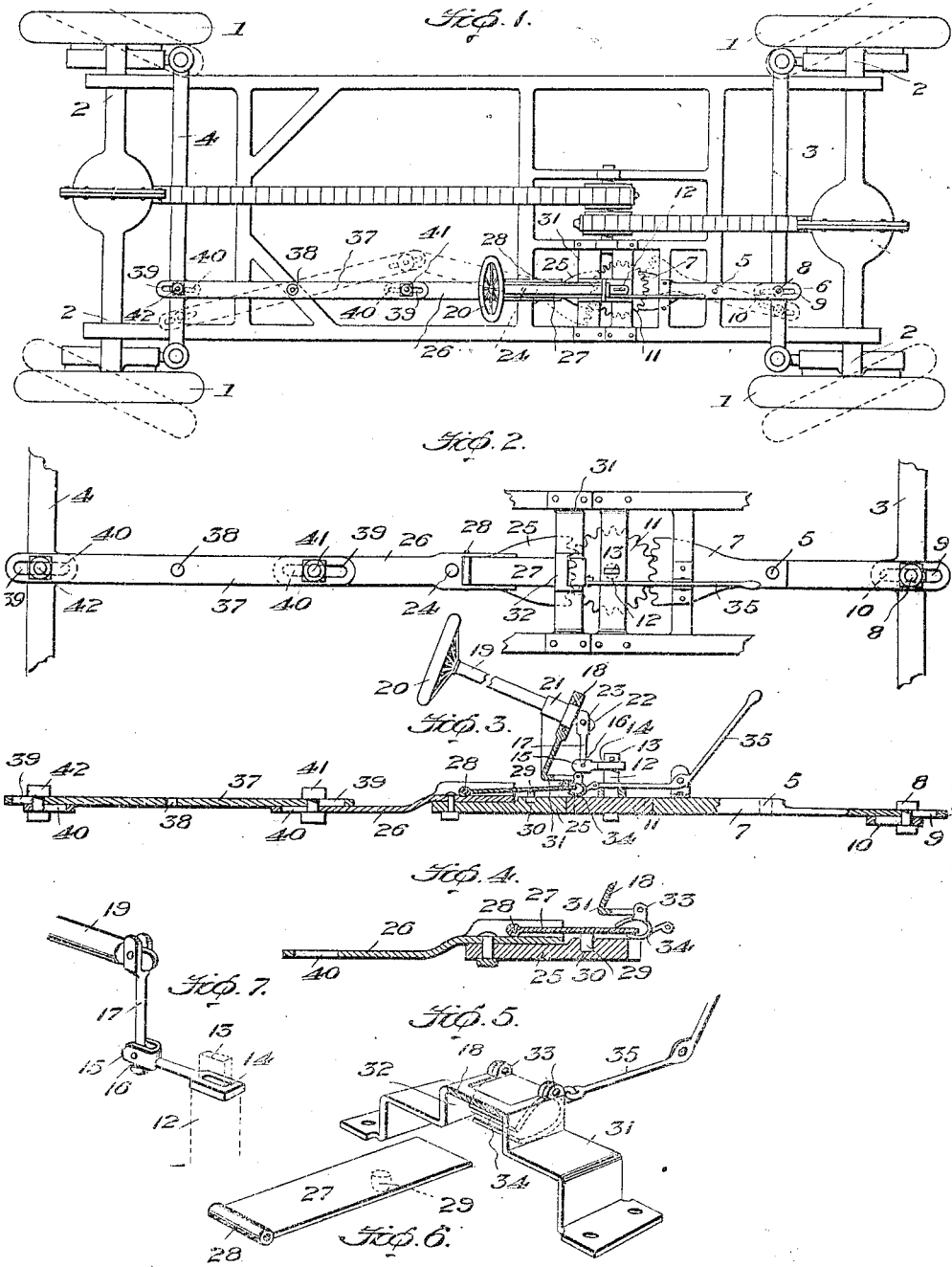

CHARLES HENRY WILLARD, OF PASADENA, CALIFORNIA, ASSIGNOR OF ONE-HALF TO DORA ROWLEY, OF GILA BEND, ARIZONA.

STEERING-GEAR.

1,045,922.  Specification of Letters Patent.  Patented Dec. 3, 1912.

Application filed September 28, 1911. Serial No. 651,806.

*To all whom it may concern:*

Be it known that I, CHARLES H. WILLARD, a citizen of the United States, residing at Pasadena, county of Los Angeles, and State of California, have invented certain new and useful Improvements in Steering-Gear, of which the following is a specification.

This invention relates to steering gear.

The present invention relates to that class of steering gear for automobiles and other vehicles wherein the four wheels of the automobile or vehicle are coupled for simultaneous turning to enable the vehicle to be turned within a shorter radius than if only the front wheels were turned.

My invention has for its object the provision of new steering gear of the type above mentioned in which provision is made for coupling or uncoupling the steering gear of the rear wheels with the steering gear of the front wheels so that under ordinary conditions of travel only the steering gear for the front wheels may be used, but when it becomes necessary to turn within a very short radius, the steering gear for the rear wheels may be coupled up and all four wheels turned.

Another object of the invention is the provision of novel connecting means, in a four wheel steering gear, whereby friction on the connecting parts is minimized and quick and short turning is rendered possible.

A still further object is to provide novel means whereby the coupling of the steering gear for the rear wheels with the steering shaft may be readily accomplished at will.

A still further object is to provide a novel connection between the steering shaft or stem and the steering gear whereby any movement of the body of the automobile or vehicle in relation to the running gear is compensated for and the steering of the vehicle facilitated.

The foregoing objects of the invention are to be considered as illustrative, rather than restrictive of its scope.

One form of the invention is set forth hereinafter and shown in the accompanying drawings, in which:—

Figure 1 is a plan view; Fig. 2, an enlarged view of the steering gear; Fig. 3, a longitudinal section through Fig. 2; Fig. 4, a longitudinal section through a part of Fig. 3; Fig. 5, a perspective of the bracket and stirrup; Fig. 6, a similar view of the latch in position for reception within the stirrup; and Fig. 7, a detail of the connection between the steering shaft and steering stem.

The present steering gear is adaptable for use in connection with any automobile or other vehicle having swinging wheels, but it is particularly adapted for use in connection with the wheels set forth in my copending application, Serial No. 607,996, filed February 11, 1911, for automobile wheels and axles.

The devices such as knuckles, caps, or other means for the pivotal mounting of the wheels 1 are shown at 2 and connected by the front steering bar 3, in one instance, and the rear steering bar 4 in the other instance.

Pivoted at 5 to the vehicle is a lever 6 which has a gear segment 7 at one end. Its other end is connected to the steering bar 3 by a bolt 8 which lies loosely in elongated slots 9 and 10 in the steering bar and lever 6 so that said bolt has free play therein. This connection is used at other points, as will presently appear, and has the combined advantage of a connector and roller bearing as the bolt turns when the lever 6 is shifted and thus effects shifting of the steering bar 3, while diminishing friction at the point of connection of the lever 6 thereto. The gear segment 7 meshes with a pinion 11 which is secured to the steering stem 12. The steering stem 12 has a flattened head 13 entering the slot 14 of the lever 15 which in turn is connected by joints 16 to lever 17, the levers 15 and 17 constituting a universal toggle joint which permits up and down play of the vehicle body without interfering with the steering of the vehicle. A suitable mounting 18 is provided for the steering shaft 19 which may have any suitable hand wheel 20, the shaft 19 being mounted at 21 in the bracket 18 in such fashion that the steering shaft 19 can be swung to various angles without interfering with the steering of the vehicle. Shaft 19 has a flattened part 22 which enters an elongated slot 23 on the lever 17.

Pivoted at 24 to the chassis is a gear segment 25 which meshes with the pinion 11. Suitably provided, preferably on pivot 24, is a lever 26 which carries a latch 27 pivoted thereto at 28 and provided with a lug or pin 29 adapted for reception in the socket 30 in the gear segment 25.

Bridging the gear segment 25 and adapted to limit the swing thereof, is a bracket 31 to a raised part 32 of which is pivoted at 33 a stirrup 34 whose arms receive the free end of the latch 27 and are curved to suitably engage the upper and lower faces thereof without interfering with the movement of the gear segment 25. To operate this stirrup there is provided a suitable pull rod 35 in convenient position for operation from the driver's seat. Suitable latching means 36 is provided to coöperate with the rod and bolt so that the stirrup will maintain the latch 27 in either raised or lowered position, and consequently enables its lug or pin 29 to engage the socket 30 in the gear segment 25, and in consequence lock the lever 26 to the gear segment, it being understood that the gear segment 25 is free from connection with the lever 26 except at such time as the lug 29 is received in the socket 30. When so received, the rear steering bar is operable from the steering mechanism, but when the lug is out of the socket, the rear steering wheels are maintained in normal position.

A lever 37 pivoted to the chassis 38 connects the lever 26 to the steering bar 4. Slots 39 and 40 and bolts 41 and 42 form the connections between the said parts. The slots and the bolts have the same function as the slot and bolt connection 8 between the lever 6 and the front steering bar 3.

Having thus described my invention, what I claim as new and desire to secure by Letters Patent, is:—

1. In a steering gear, the combination with front and rear steering wheels, steering bars for the respective sets of wheels, a series of articulated levers connecting the steering bars of the front and rear wheels, means for operating said series of levers, and connections between the levers themselves and between the levers and the steering bars embodying in each instance a slot and a pivot member loose and individually rotatable therein.

2. In a steering gear, the combination with a toothed member, of a steering device for shifting said toothed member, other toothed members engaged with the aforesaid toothed member, front and rear wheels, an operative connection between one of the last-named toothed members and one set of the steering wheels, a member adapted for shifting the other set of steering wheels, a latching lever adapted for connecting said member to the other of the last-named toothed members, and a device for engaging said latching member with or disengaging it from said toothed member.

3. In a steering gear, the combination with a toothed member, of a steering device for shifting said toothed member, other toothed members engaged with the aforesaid toothed member, front and rear steering wheels, an operative connection between one of the last-named toothed members and one set of the steering wheels, a member adapted for shifting the other set of steering wheels, a latching lever adapted for connecting said member to the other of the last-named members, a stirrup between whose arms the latching member is loosely received and by which said latching member is shifted into or out of engagement with said toothed member, and a device for locking said stirrup for the foregoing purpose.

In testimony whereof, I hereunto affix my signature in presence of two witnesses.

CHARLES HENRY WILLARD.

Witnesses:
H. T. QUAST,
JOHN M. GATES.